(No Model.)
M. DEETZ.
REMOVABLE RUNNER FOR VEHICLES.
No. 304,621. Patented Sept. 2, 1884.
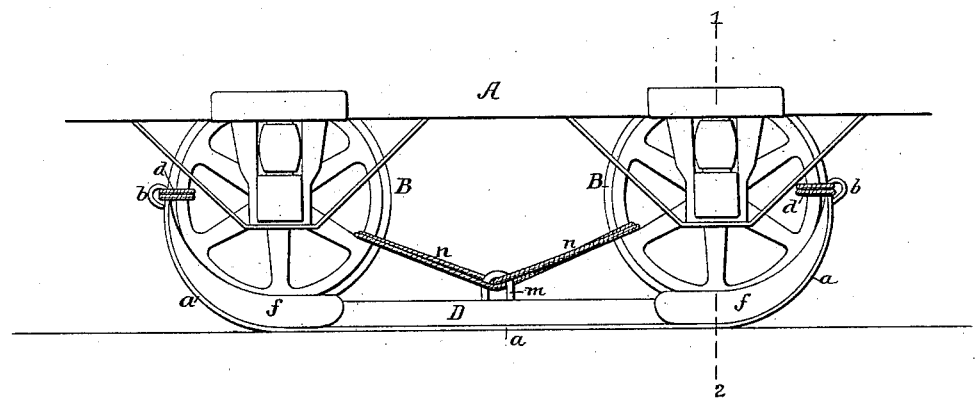
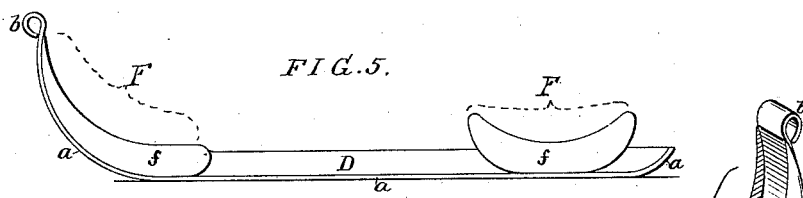
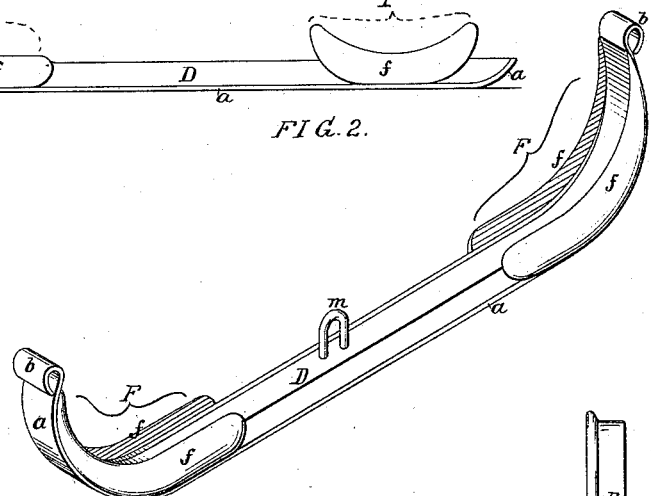
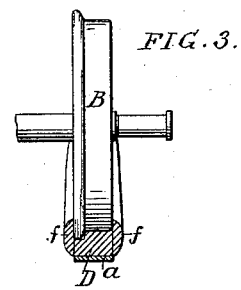
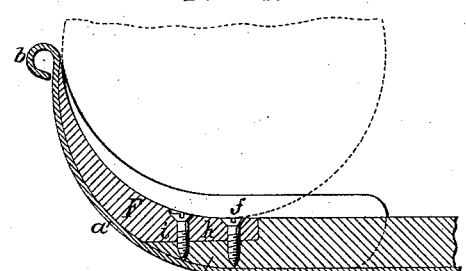
Witnesses
John E. Parker
Harry Smith
Inventor
Manassah Deetz
by his attys.
Howson and Sons

UNITED STATES PATENT OFFICE.

MANASSAH DEETZ, OF PHILADELPHIA, PENNSYLVANIA.

REMOVABLE RUNNER FOR VEHICLES.

SPECIFICATION forming part of Letters Patent No. 304,621, dated September 2, 1884.

Application filed February 18, 1884. (No model.)

*To all whom it may concern:*

Be it known that I, MANASSAH DEETZ, a citizen of the United States, and a resident of Philadelphia, Pennsylvania, have invented certain Improvements in Removable Runners for Vehicles, of which the following is a specification.

My invention consists of an improvement in runners for application to the wheels of cars, wagons, and other vehicles, so as to render them available as sleds, the objects of my improvement being to construct a cheap and durable runner and to provide for the ready application of the same to or its removal from the wheels, and for the secure retention of the same when adjusted.

In the accompanying drawings, Figure 1 is a side view of part of a car with my improved runner applied to the wheels; Fig. 2, a perspective view of the runner; Fig. 3, a section on the line 1 2, Fig. 1, with the wheel in elevation; Fig. 4, a longitudinal section of one end of the runner on a larger scale than the other figures, and Fig. 5 a view of a modification.

A represents part of the frame of a car, and B B two of the wheels of the same; or the wheels may be those of a wagon or other vehicle.

D is the runner, which is preferably made of wood faced with a metal strip, $a$, the opposite ends of which are bent into loops $b$ for the reception of the lashings $d$, whereby said ends are secured to the wheels B. At each end of the runner is a shoe, F, having opposite ribs or flanges $f$, which embrace the runner and project above the upper edge of the same, so that they perform the double duty of protecting the ends of the runner from injury and of preventing the lateral displacement of the runner. The runner has a recessed end, $g$, and the shoe has a tongue, $h$, adapted thereto and secured to the runner by means of screws $i$, or equivalent fastenings. The runner has a central eye, $m$, which is connected to the wheels B by suitable lashings, $n$, these lashings with those at the ends of the runner serving to confine the latter vertically to the wheels, while longitudinal displacement is prevented by the curved ends of the runner, and lateral displacement by the flanges $f$ of the shoes F, these flanges, as before stated, projecting above the runner, so as to have a bearing against the sides of the wheels B.

It is not necessary to the proper carrying out of my invention that the shoes F should be applied to both the front and rear ends of the runners, as in some cases the shoes at the rear ends may be dispensed with; or a modified form of shoe adapted to the lower portion only of the wheel may be applied to the runner at or near the rear end, as shown in Fig. 5, there being no longitudinal strain upon the rear shoe, and hence no necessity for carrying the same up around the rim of the wheel, as in the front shoe. This construction is of course more applicable to wagons or other vehicles, which are intended to be drawn in one direction only, than to street-cars and similar double-ended vehicles, which are liable to be drawn either end first.

Having thus described my invention, what I claim, and desire to secure by Letters Patent, is—

1. The combination of the wheels, the runner having central eye, $m$, and end eyes, $b$, and the lashings $n$ and $d$, as set forth.

2. The combination of the runner with the shoe F, having flanges $f$, overlying and protecting the sides of the runner at the end of the same, as specified.

In testimony whereof I have signed my name to this specification in the presence of two subscribing witnesses.

MANASSAH DEETZ.

Witnesses:
HENRY SNYDER,
JAMES HOOD.